United States Patent
Al-Nakhli et al.

(10) Patent No.: US 9,738,824 B2
(45) Date of Patent: *Aug. 22, 2017

(54) TIGHT GAS STIMULATION BY IN-SITU NITROGEN GENERATION

(71) Applicant: Saudi Arabian Oil Company, Dhahran (SA)

(72) Inventors: Ayman Raja Al-Nakhli, Dhahran (SA); Hazim Hussein Abass, Dhahran (SA); Ali A. Al-Taq, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/640,625

(22) Filed: Mar. 6, 2015

(65) Prior Publication Data

US 2015/0175879 A1   Jun. 25, 2015

Related U.S. Application Data

(62) Division of application No. 13/683,485, filed on Nov. 21, 2012, now abandoned.

(60) Provisional application No. 61/563,233, filed on Nov. 23, 2011.

(51) Int. Cl.
| | |
|---|---|
| C09K 8/62 | (2006.01) |
| C09K 8/68 | (2006.01) |
| E21B 43/26 | (2006.01) |
| C09K 8/92 | (2006.01) |
| E21B 36/00 | (2006.01) |
| E21B 43/24 | (2006.01) |

(52) U.S. Cl.
CPC .................. *C09K 8/68* (2013.01); *C09K 8/62* (2013.01); *C09K 8/92* (2013.01); *E21B 36/008* (2013.01); *E21B 43/2405* (2013.01); *E21B 43/26* (2013.01)

(58) Field of Classification Search
CPC ........ C09K 8/588; C09K 8/524; C09K 8/584; C09K 3/30; C09K 5/045; C09K 8/00; C09K 8/12; C09K 8/487; C09K 8/54; C09K 8/5751; C09K 8/62; C09K 8/685; C09K 8/706; C09K 8/80; C09K 8/805; C09K 8/845; C09K 8/72; C09K 8/58; C09K 8/607; C09K 8/92; E21B 43/26; E21B 36/008; E21B 43/16; E21B 43/166; E21B 43/24; E21B 43/25
See application file for complete search history.

(56) References Cited

U.S. PATENT DOCUMENTS

| | | |
|---|---|---|
| 1,677,260 A | 7/1928 | Whitman |
| 1,819,055 A | 8/1931 | Jan et al. |
| 1,990,969 A | 2/1935 | Wilson |
| 2,094,479 A | 9/1937 | Vandergrift |
| 2,288,556 A | 6/1942 | Vollmer |
| 2,466,674 A | 4/1949 | Mullady |
| 2,606,813 A | 8/1952 | Kahr |
| 2,699,213 A | 1/1955 | Cardwell et al. |
| 2,885,004 A | 5/1959 | Perry |
| 3,025,911 A | 3/1962 | Bergman |
| 3,354,954 A | 11/1967 | Buxton |
| 3,385,360 A | 5/1968 | Smith |
| 3,405,761 A | 10/1968 | Parker |
| 3,476,183 A | 11/1969 | Haynes, Jr. et al. |
| 3,483,923 A | 12/1969 | Darley |
| 3,543,856 A | 12/1970 | Knox et al. |
| 3,568,772 A | 3/1971 | Gogarty et al. |
| 3,576,596 A | 4/1971 | Kranc et al. |
| 3,707,192 A | 12/1972 | Goins, Jr. et al. |
| 3,712,380 A | 1/1973 | Caffey |
| 3,719,228 A | 3/1973 | Carcia |
| 3,760,881 A | 9/1973 | Kiel |
| 3,828,854 A | 8/1974 | Templeton et al. |
| 3,864,451 A | 2/1975 | Lee et al. |
| 4,056,146 A | 11/1977 | Hall |
| 4,085,799 A | 4/1978 | Bousaid et al. |
| 4,136,739 A | 1/1979 | Salathiel et al. |
| 4,158,042 A | 6/1979 | Deutschman |
| 4,178,993 A | 12/1979 | Richardson et al. |

(Continued)

FOREIGN PATENT DOCUMENTS

| | | | |
|---|---|---|---|
| CN | 101323780 A | | 11/1993 |
| CN | 101839123 A | | 9/2010 |
| EP | 0654582 A1 | | 5/1995 |
| EP | 0909873 | * | 4/1999 |
| EP | 0909873 A2 | | 4/1999 |
| JP | 2001019984 | | 1/2001 |
| JP | 2005015533 | | 1/2005 |
| RU | 2100583 C1 | | 12/1997 |
| RU | 2126084 C1 | | 2/1999 |
| RU | 2194156 C1 | | 12/2002 |

(Continued)

OTHER PUBLICATIONS

Jamaluddin A.K.M. et al. Field testing of the formation heat treatment process, The petroleum society, Paper 96-88, 1996.*

(Continued)

*Primary Examiner* — Kumar R Bhushan
(74) *Attorney, Agent, or Firm* — Bracewell LLP; Constance G. Rhebergen; Kevin R. Tamm

(57) ABSTRACT

Provided is a method and composition for the in-situ generation of synthetic sweet spots in tight-gas formations. The composition can include nitrogen generating compounds, which upon activation, react to generate heat and nitrogen gas. The method of using the composition includes injecting the composition into a tight-gas formation such that upon activation, heat and nitrogen gas are generated. Upon the generation of nitrogen gas and heat within the formation, microfractures are produced within the formation and the hydrostatic pressure within the reservoir is reduced to less than the reservoir fluid pressure, such that the rate of production of hydrocarbons from the formation is increased.

14 Claims, 5 Drawing Sheets

(56) References Cited

U.S. PATENT DOCUMENTS

| | | | |
|---|---|---|---|
| 4,210,628 A | 7/1980 | Ninomiya et al. | |
| 4,219,083 A | 8/1980 | Richardson et al. | |
| 4,232,740 A | 11/1980 | Park | |
| 4,232,741 A | 11/1980 | Richardson et al. | |
| 4,291,765 A | 9/1981 | Gilchrist et al. | |
| 4,330,037 A | 5/1982 | Richardson et al. | |
| 4,399,868 A | 8/1983 | Richardson et al. | |
| 4,410,041 A | 10/1983 | Davies et al. | |
| 4,414,118 A | 11/1983 | Murphey | |
| 4,454,918 A | 6/1984 | Richardson et al. | |
| 4,475,595 A | 10/1984 | Watkins et al. | |
| 4,482,016 A * | 11/1984 | Richardson | C09K 8/72 166/300 |
| 4,485,007 A | 11/1984 | Tam et al. | |
| 4,491,180 A | 1/1985 | Brown et al. | |
| 4,518,040 A | 5/1985 | Middleton | |
| 4,572,297 A | 2/1986 | Thigpen, Jr. et al. | |
| 4,615,391 A | 10/1986 | Garthoffner | |
| 4,703,803 A | 11/1987 | Blumer | |
| 4,842,073 A | 6/1989 | Himes et al. | |
| 4,846,277 A * | 7/1989 | Khalil | C09K 8/703 166/280.1 |
| 4,865,826 A | 9/1989 | Carnell et al. | |
| 4,898,750 A | 2/1990 | Friedman et al. | |
| 4,919,209 A | 4/1990 | King | |
| 5,082,058 A | 1/1992 | Blumer | |
| 5,087,350 A | 2/1992 | Paris-Marcano | |
| 5,152,906 A | 10/1992 | Aften et al. | |
| 5,183,581 A | 2/1993 | Khalil et al. | |
| 5,197,544 A | 3/1993 | Himes | |
| 5,209,295 A | 5/1993 | Campos et al. | |
| 5,342,530 A | 8/1994 | Aften et al. | |
| 5,358,565 A | 10/1994 | Shu | |
| 5,375,660 A | 12/1994 | Wehunt | |
| 5,411,094 A | 5/1995 | Northrop | |
| 5,639,313 A | 6/1997 | Khalil | |
| 5,958,224 A | 9/1999 | Ho et al. | |
| 6,035,933 A | 3/2000 | Khalil et al. | |
| 6,277,271 B1 | 8/2001 | Kocal | |
| 6,500,219 B1 | 12/2002 | Gunnerman | |
| 6,554,071 B1 | 4/2003 | Crook et al. | |
| 6,662,874 B2 | 12/2003 | Surjaatmadja et al. | |
| 6,722,434 B2 | 4/2004 | Reddy et al. | |
| 6,827,845 B2 | 12/2004 | Gong et al. | |
| 6,881,325 B2 | 4/2005 | Morris et al. | |
| 6,992,048 B2 | 1/2006 | Reddy et al. | |
| 7,029,639 B2 | 4/2006 | Yasutake et al. | |
| 7,059,414 B2 | 6/2006 | Rae et al. | |
| 7,066,260 B2 | 6/2006 | Sullivan et al. | |
| 7,153,434 B1 | 12/2006 | Dennis | |
| 7,328,746 B2 | 2/2008 | Al-Taq et al. | |
| 7,540,328 B2 | 6/2009 | Brown et al. | |
| 7,589,050 B2 | 9/2009 | Frenier et al. | |
| 7,624,743 B2 | 12/2009 | Sarkar et al. | |
| 7,686,084 B2 | 3/2010 | Reddy et al. | |
| 7,779,915 B2 | 8/2010 | Hutchins et al. | |
| 7,947,629 B2 | 5/2011 | Fuller | |
| 8,096,361 B2 | 1/2012 | Willberg | |
| 8,216,344 B2 | 7/2012 | Degenstein et al. | |
| 8,282,715 B1 | 10/2012 | Degenstein et al. | |
| 8,962,536 B2 | 2/2015 | Winslow et al. | |
| 2003/0092581 A1 | 5/2003 | Crews | |
| 2003/0221831 A1* | 12/2003 | Reddy | C04B 20/12 166/293 |
| 2005/0000694 A1 | 1/2005 | Dalrymple et al. | |
| 2005/0215439 A1 | 9/2005 | Blair | |
| 2006/0144591 A1 | 7/2006 | Gonzalez et al. | |
| 2006/0154814 A1 | 7/2006 | Zanibelli et al. | |
| 2008/0066784 A1* | 3/2008 | Sarkar | C09K 8/524 134/22.1 |
| 2008/0121395 A1 | 5/2008 | Reddy | |
| 2008/0190607 A1 | 8/2008 | Minnich et al. | |
| 2008/0190610 A1 | 8/2008 | Barmatov et al. | |
| 2008/0289828 A1 | 11/2008 | Hutchins et al. | |
| 2008/0318812 A1 | 12/2008 | Kakadjian, Sr. et al. | |
| 2009/0098467 A1 | 4/2009 | Lowe et al. | |
| 2010/0056399 A1 | 3/2010 | Berkland et al. | |
| 2010/0170453 A1 | 7/2010 | Betzer-Zilevitch | |
| 2010/0288499 A1 | 11/2010 | Al-Dhafeeri et al. | |
| 2011/0030958 A1 | 2/2011 | Fedorov et al. | |
| 2011/0203797 A1 | 8/2011 | Alexandrov et al. | |
| 2011/0220360 A1 | 9/2011 | Lindvig et al. | |
| 2012/0211225 A1 | 8/2012 | Kostrov et al. | |
| 2013/0123151 A1 | 5/2013 | Crews | |
| 2013/0126169 A1 | 5/2013 | Al-Nakhli et al. | |
| 2013/0180720 A1 | 7/2013 | Al-Dahlan et al. | |
| 2014/0090839 A1 | 4/2014 | Al-Nakhil et al. | |
| 2014/0144632 A1 | 5/2014 | Zavolzhski et al. | |

FOREIGN PATENT DOCUMENTS

| | | | |
|---|---|---|---|
| SU | 1677260 A | | 9/1991 |
| WO | 0037777 A1 | | 6/2000 |
| WO | 2006131895 A1 | | 12/2006 |
| WO | 2007015391 A1 | | 2/2007 |
| WO | 2008032067 A1 | | 3/2008 |
| WO | WO2008/032067 | * | 3/2008 |
| WO | 2009009370 A1 | | 1/2009 |
| WO | 2009070561 A1 | | 6/2009 |
| WO | 2010046618 A1 | | 4/2010 |
| WO | 2010047612 A1 | | 4/2010 |
| WO | 2012012224 A1 | | 1/2012 |
| WO | 2012025150 A1 | | 3/2012 |
| WO | 2012082402 A2 | | 6/2012 |
| WO | 2013078306 A1 | | 5/2013 |

OTHER PUBLICATIONS

C. N. Khalil, Improving matrix acidizing with nitrogen and heat in-situ generation, 21113-MS SPE Conference, 1990.*

L. C. C. Marques et al., "A New Technique to Solve Gas Hydrate Problems in Subsea Christmas Trees." SPE 77572, SPE Production & Facilities, Nov. 2004, pp. 253-258, Society of Petroleum Engineers.

Ayman R. AL-Nakhli, Chemically Induced Pressure Pulse to Increase Stimulated Reservoir Volume in Unconventional Reservoirs, Unconventional Resources Technology Conference, Denver Co, Aug. 25 -27, 2014.

J. P. Ashton et al., "In-Situ Heat System Stimulates Paraffinic-Crude Producers in Gulf of Mexico," SPE 15660, SPE Production Engineering, May 1989, pp. 157-160, vol. 4, No. 2, Society of Petroleum Engineers.

Cheng Yun-Fu et al. "Preparation and Field Uses of Heat Generating Hydrofracturing Fluids" Oilfield Chemistry Research Institute of Drilling and Production, Dagang Oil Fields, Dagang Oilfield Group Co., Ltd. vol. 14, No. pp. 24-27, Mar. 25, 1997.

U.S. Appl. No. 14/689,874, filed Apr. 17, 2015, titled "Chemically-Induced Pulsed Fracturing Method".

U.S. Appl. No. 14/689,901, filed Apr. 17, 2015, titled "Method for Enhanced Fracture Clenup Using Redoxx Treatment".

Database WPI, Week 201115, XP-002693470, Thomson Scientific, London, GB, C:\EPOPROGS\SEA\.\..\.. \epodata\sea\eplogf\internal.log.

European Search Report and Written Opinion issued on Aug. 2, 2013, for related European Patent Application 13174172.

C. N. Khalil et al., "Detection of Formation Damage Associated to Paraffin in Reservoirs of the Reconcavo Baiano, Brazil," SPE 37238, Int'l Symposium on Oilfield Chemistry held in Houston, TX, Feb. 18-21, 1997, Society of Petroleum Engineers, Inc.

Anning Zhou et al., "Deep Desulfurization of Diesel Fuels by Selective Adsorption with Activated Carbons," Prepr. Pap-Am Chem. Soc., Div. Pet. Chem., 2004, vol. 49 (3), pp. 329-332.

International Search Report with Written Opinion issued in related PCT Patent Application No. PCT/US2013/043076; dated Apr. 8, 2014; 10 pages.

International Search Report and Written Opinion issued in related PCT Patent Application No. PCT/US2012/066249; dated Mar. 5, 2013; 14 pages.

(56) References Cited

OTHER PUBLICATIONS

International Search Report with Written Opinion issued in related PCT Patent Application No. PCT/US2013/021961; dated Mar. 18, 2013; 15 pages.
International Search Report with Written Opinion issued in related PCT Patent Application No. PCT/US2012/066249; dated Mar. 5, 2013; pages.
Schlumberger, Systems, Sand Control Pumping, pp. 37-70, USA, available at www.slb.com/~/media/files/sand_control/.../scps_03_systems.ashx. Feb. 27, 2012.
Yosuke Sano et al., "Selection and Further Activation of Activated Carbons for Removal of Nitrogen Species in Gas Oil as a Pretreatment for Its Deep Hydrodesulfurization," Energy & Fuels 2004, vol. 18, pp. 644-651.

\* cited by examiner

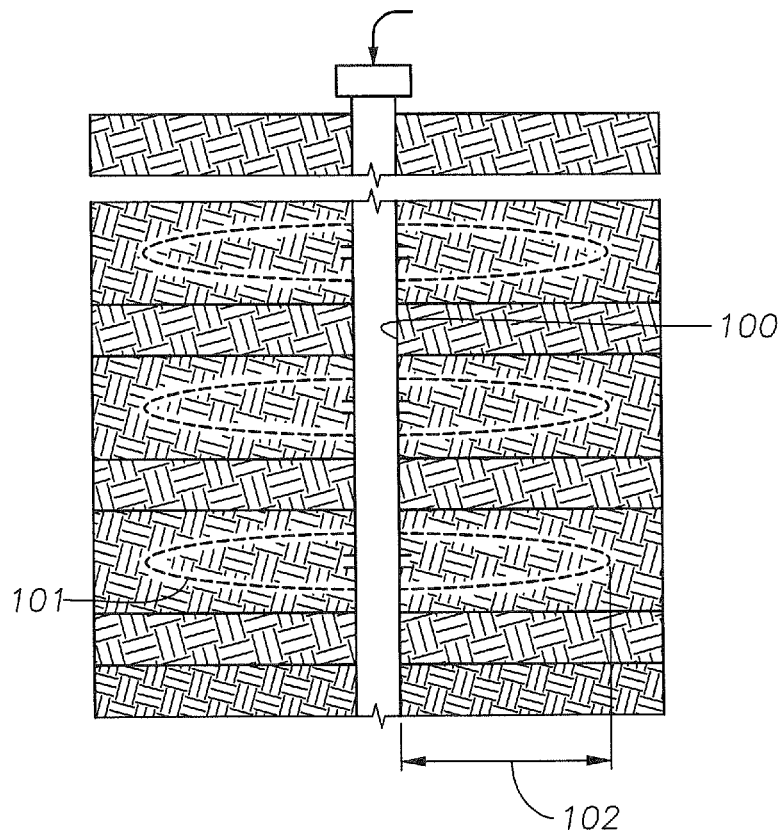
FIG. 1
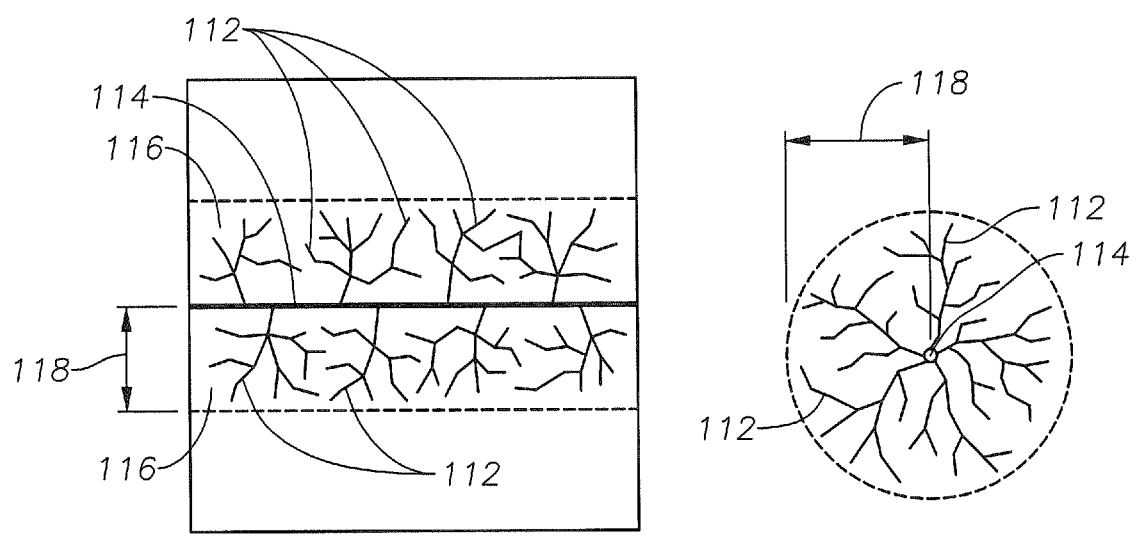
FIG. 2
FIG. 3

TIGHT GAS STIMULATION BY IN-SITU NITROGEN GENERATION

RELATED APPLICATIONS

This application is a divisional of U.S. patent application Ser. No. 13/683,485, filed on Nov. 21, 2012, which claims priority to U.S. provisional application Ser. No. 61/563,233, filed Nov. 23, 2011, all of which are incorporated herein by reference in their entirety.

FIELD OF THE INVENTION

This invention relates to gas well stimulation and compositions for the stimulation of hydrocarbon reservoirs, including liquid and gas wells.

BACKGROUND OF THE INVENTION

The search for and recovery of oil is becoming increasingly difficult as world-wide petroleum reserves decline. In many instances, reserves trapped within certain low permeability formations, such as certain sand, carbonate, and/or shale formations, exhibit little or no production, and are thus economically undesirable to develop at current oil and gas prices. In certain unconventional formations, such as low permeability formations, the most important element that determines whether developing reservoir will be economically viable is finding sweet spots in the reservoir. It is well established that tight gas wells can become commercially viable when a sweet spot is encountered. A sweet spot is generally defined herein as the area within a reservoir that represents the best production or potential for production. Unfortunately, current technologies are unable to locate or predict when and where sweet spots exist within a given formation.

In tight reservoirs, due to low permeability of the formation, well productivity is typically low, thus making the well non-economical from a standpoint of development. Stimulation treatments are one known method that can be used to enhance well productivity and improve the economics of developing the well. One commonly employed technique for stimulating low productivity wells is hydraulic fracturing, which typically involves the injection of high viscosity fluids into the well at a sufficiently high rate so that enough pressure is built up inside the wellbore to split the formation apart. The resulting hydraulically induced fracture that is produced extends from the wellbore deep into the formation. Those of skill in the art can design the stimulation job based upon the desired height and length of the induced fracture.

Stimulation procedures can employ several techniques to insure that the induced fracture becomes conductive when injection is ceased. For example, during acid fracturing of carbonate formations, acid based fluids are injected into the formation to create an etched fracture and conductive channels, which are left open upon closure of the fracture. In use with sand or shale formations, a proppant can be included with the fracturing fluid such that the induced fracture remains propped open as it closes. These methods, however, have limited uses. For example, because shale and sandstone formations do not react with acids, acid stimulation fluids are typically not employed, and only hydraulic fracturing with proppants is employed. In carbonate formations, however, both acid fracturing fluids and proppants can be employed. These techniques, however, typically use chemicals that require extensive procedures to ensure low environmental impact to the formation and surrounding area.

Thus, additional needs exist for the ability to enhance production within a tight gas formation to enhance production thereof. Specifically, methods and compositions having low environmental impact are needed for the creation of synthetic sweet spots.

SUMMARY OF THE INVENTION

Generally, methods and compositions for the creation of synthetic sweet spots are provided.

In one aspect, a reaction mixture for the in-situ generation of nitrogen within tight gas wells is provided. The reaction mixture can include an ammonium containing compound, a nitrite containing compound; and a hydrogen releasing activator. At least one of the ammonium containing compound and the nitrite containing compound are encapsulated with a coating operable to delay the reaction of the ammonium and nitrite containing compounds.

In certain embodiments, the ammonium containing compound is ammonium chloride. In certain embodiments, the nitrite containing compound is sodium nitrite. In certain embodiments, the coating encapsulating at least one of the ammonium containing compound and the nitrite containing compound is a polymer selected from guar, chitosan, polyvinyl alcohol, and like compounds. In certain other embodiments, the coating encapsulating at least one of the ammonium containing compound and the nitrite containing compound is selected from 55-carboxymethyl cellulose, xanthan, and like compounds. In certain embodiments, the activator is selected from acetic acid and hydrochloric acid.

In another aspect, a method for stimulating production of gas in a tight-gas formation, the method comprising the steps of injecting into the formation an aqueous solution that includes an ammonium containing compound and a nitrite containing compound, wherein at least one of the ammonium containing compound and the nitrite containing compound comprise a coating which is operable to prevent reaction therebetween; and then injecting an activator into the formation, the activator being capable of initiating reaction between the ammonium containing compound and the nitrite containing compound such that the reaction generates heat and nitrogen gas. Upon the generation of nitrogen gas and heat within the formation, microfractures are produced within the formation and the hydrostatic pressure within the reservoir is reduced to less than the reservoir fluid pressure, such that the rate of production of hydrocarbons from the formation is increased.

In certain embodiments, the method further includes the step of first injecting an aqueous fracturing fluid into the tight-gas formation, wherein said aqueous fracturing fluid comprises water and a fracturing polymer gel, wherein the step of injection of the aqueous fracturing fluid is achieved at a sufficient rate and pressure to fracture the formation. In certain embodiments, the ratio of the ammonium containing compound to the nitrite containing compound is between about 1.1:1 and 1:1.1. In certain embodiments, the activator is a weak acid and weak acid salt, said weak acid and weak acid salt being present in a ratio providing an acidic solution pH at which said ammonium and nitrite ion-containing compound react. In certain embodiments, the mixture of weak acid and weak acid salt are present in a concentration providing an aqueous solution of weak acid which is capable of effecting a weak acid reservoir acidization of materials contacted in or around the fracture created within the well. In certain embodiments, the mixture of weak acid and weak acid salt are injected into the formation in a solution having a concentration between about 2-10% by volume. In certain embodiments, the ammonium containing compound is ammonium chloride and the nitrite containing compound is sodium nitrite.

In another aspect of the present invention, a method for stimulating production of gas in a tight-gas formation is provided. The method comprising the steps of injecting into the tight-gas formation an aqueous solution that includes an ammonium containing compound and a nitrite containing compound, wherein at least one of the ammonium containing compound and the nitrite containing compound are encapsulated with a coating operable to delay reaction therebetween, wherein the aqueous solution is injected at a sufficient rate and pressure to cause fractures in the tight-gas formation, wherein the fractures extend into the tight-gas formation, wherein the fractures have a fracture surface, and injecting an activator into the tight-gas formation, the activator being capable of initiating reaction between the ammonium containing compound and the nitrite containing compound such that the reaction generates heat and nitrogen gas, and allowing the generation of nitrogen gas and heat within the tight-gas formation to effect stimulation of the fracture surface, wherein the stimulation of the fracture surface produces microfractures at the fractures, wherein the hydrostatic pressure within the reservoir is reduced to less than the reservoir fluid pressure, such that the rate of production of hydrocarbons from the tight-gas formation is increased.

In certain embodiments, the method further includes the step of first injecting an aqueous fracturing fluid into the tight-gas formation, wherein said aqueous fracturing fluid comprises water and a fracturing polymer gel. In certain embodiments, the ratio of the ammonium containing compound to the nitrite containing compound is between about 1.1:1 and 1:1.1. In certain embodiments, the activator is a weak acid and weak acid salt, said weak acid and weak acid salt being present in a ratio providing an acidic solution pH at which said ammonium and nitrite ion-containing compound react. In certain embodiments, the mixture of weak acid and weak acid salt are present in a concentration providing an aqueous solution of weak acid which is capable of effecting a weak acid reservoir acidization of materials contacted in or around the fracture created within the well. In certain embodiments, the mixture of weak acid and weak acid salt are injected into the formation in a solution having a concentration between about 2-10% by volume. In certain embodiments, the ammonium containing compound is ammonium chloride and the nitrite containing compound is sodium nitrite. In certain embodiments, no clean-up procedure is required. In certain embodiments, the generation of nitrogen gas creates an area of localized pressure. In certain embodiments, the generation of nitrogen gas and heat is operable to cause tensile and thermal fractures. In certain embodiments, the delay in reaction allows the aqueous solution to migrate into the fractures created within the tight-gas formation during the step of injection the aqueous solution. In certain embodiments, a synthetic sweet spot is created, thereby stimulating production of gas.

BRIEF DESCRIPTION OF THE DRAWINGS

FIG. 1 is a schematic of one embodiment.
FIG. 2 is a schematic of one embodiment.
FIG. 3 is a top view schematic of the embodiment shown in FIG. 2.

DETAILED DESCRIPTION OF THE INVENTION

Figure 4:
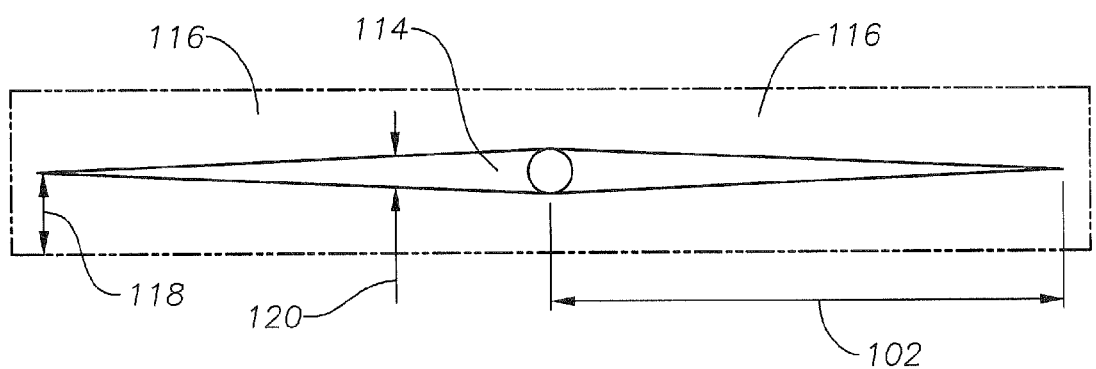
FIG. 4 is a schematic of one embodiment.

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein and provided in the appended figures are set forth without any loss of generality, and without imposing limitations, on the claimed invention.

The methods described herein are directed to the generation of sweet spots at or near an fracture induced during a hydraulic fracturing procedure. When the present technique is utilized during hydraulic fracturing treatments, a synthetic sweet spot can be created, thereby stimulating production and enabling maximum enhancement of gas production. The technology and the techniques described herein thus can greatly increase the chances of recovering gases from low permeability reservoirs and will improve the economics of the development thereof.

FIG. 1 is a schematic drawing of a wellbore used for hydraulic fracturing operations, wherein a viscous fluid, preferably an aqueous fluid, is injected into the wellbore 100 at a high flow rate such that enough pressure is created inside the wellbore to cause fractures in the formation. Generally, the fracture produced during hydraulic fracturing can extend deep into the formation, as shown in the region of hydraulic fracturing 101. For example, as shown in FIG. 1, the length of the fracture 102 is shown to extend into the formation. In some embodiments, the length of the fracture can extend from 25 to 100 meters. Additionally, the hydraulic fracturing process can be designed such that the fracture extends outward from the wellbore in multiple directions.

Thus, provided herein are methods and compositions for the stimulation of tight gas wells to generate synthetic sweet spots to increase well productivity. The methods and compositions can, in certain embodiments, be utilized in conjunction with standard hydraulic fracturing techniques. For example, the well stimulation process can involve the step of first injecting fluid into the hole at a sufficiently high injection rate to build enough pressure in the wellbore, across treated formation, to initiate and propagate a hydraulic fracture in the referenced formation.

In one embodiment, a method is provided for creating a synthetic sweet spot within a tight-gas formation. The method utilizes the step of injection an inventive composition that takes advantage of an oxidation-reduction reaction (also referred to herein as a ReDox composition) for the in-situ generation of nitrogen gas within the tight gas formation to thereby create an area of localized pressure. By creating this area localized pressure within the formation, micro-fracturing of the nearby strata occurs; thereby improving the permeability of near fracture surface of the formation. The method can include the step of supplying a composition that includes compounds containing ammonium ions and nitrite ions to the formation, which can then react exothermically and generate gaseous nitrogen. In certain embodiments, all or a portion of the oxidation-reduction composition can be incorporated with fracturing fluids and injected during a hydraulic fracturing treatment.

FIG. 2 shows the propagation of microfractures 112 within and extending from the fractures 114 produced as a result of the hydraulic fracturing procedure, thus creating sweet spots 116. Generally, depending upon the reactants and the volume of nitrogen gas produced therefrom, the microfractures 112 can extend throughout pseudo fracture width 118 from the initial fracture created during hydraulic fracturing. FIG. 3 similarly shows the top view of the same.

FIG. 4 is another schematic demonstrating the generation of sweet spots 116 within the formation. The figure shows the length of fracture 102 that can extend through the formation. In some embodiments, this length of fracture 102 can extend up to 100 meters. In some embodiments, this length of fracture 102 can extend up to 50 meters. In some embodiments, this length of fracture 102 can extend up to 25 meters. The figure shows that the fracture width 120 that results utilizing known fracturing techniques. In some embodiments, this fracture width is about 0.5 centimeters. In other embodiments, this fracture width is less than 0.5 centimeters. Utilizing the compositions and methods described herein, however, provide the surprising result of a pseudo fracture width 118, such that a sweet spot is created at and around the fracture site. In some embodiments, this pseudo fracture width is 1-3 meters in width.

The in-situ generation of nitrogen and heat (and resulting increase in pressure within the formation at the reaction site), increases the permeability of tight gas formations. The heat and gas that are generated by the reaction can cause tensile and thermal fractures within the hydraulically induced and the existing fractures in the formation. It is understood that the generation of the microfractures within the formation may depend on the type of formation being treated.

In certain embodiments, the method includes the steps of injecting a reducing agent (or reducer) and an oxidizing agent (or oxidizer) into a formation, followed by the injection of an activator. In certain embodiments, the activator can be an acid. In certain embodiments, heat can be separately or additionally supplied from the formation or by separate means as an activator. The base fluids (i.e., the oxidizing and reducing agents) and activator can be injected into the formation during hydraulic fracturing, and enter into the newly created hydraulic fracture. As soon as the activator has been injected into the formation and comes into contact with the oxidizing agent and the reducing agent, the oxidation/reduction reaction proceeds and large amounts of gas and heat are generated. The gas that is generated and the low local permeability favor an increase in pore pressure, thus causing the initiation of microfractures at or near the induced fracture. The result is the stimulation of the fracture surface, rather than damage to the formation, which is frequently the case during hydraulic fracturing. In may ways, the stimulation process provided herein is less harsh and severe than the prior art stimulation techniques, and reduces or eliminates the damage to the formation that is frequently encountered with the prior art techniques. This results in additional conductivity within the formation near the fracture. This is an additional advantage of the methods disclosed herein over the prior art stimulation methods.

Figure 5:
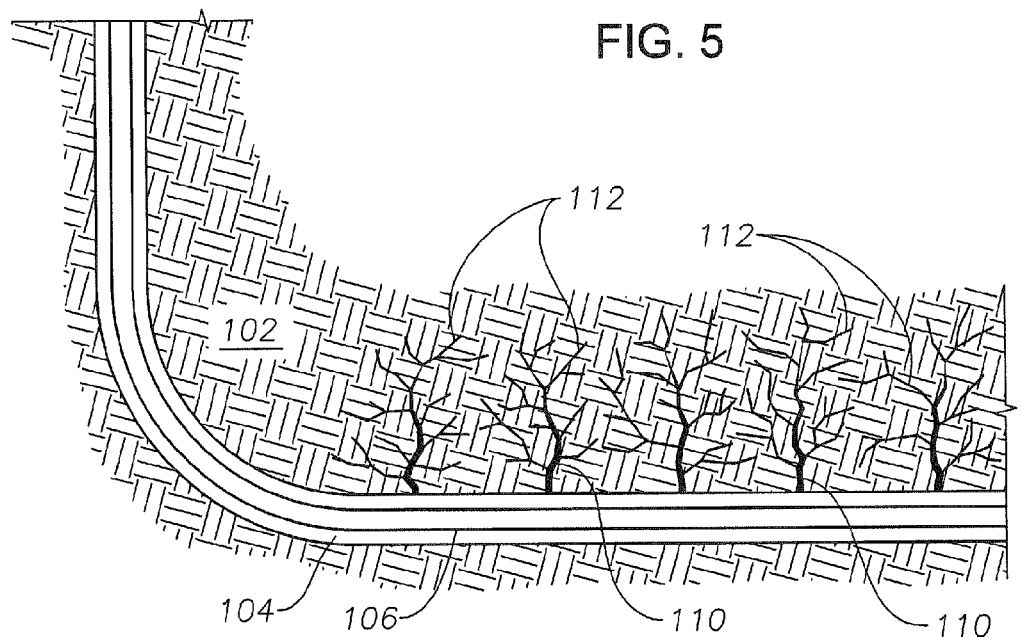
FIG. 5 is a schematic of one embodiment.

FIG. 5 shows the predicted release of nitrogen gas within the formation, wherein the nitrogen gas is predicted to migrate into the fractures created within the formation during the hydraulic fracturing to form additional microfractures within the formation. Referring now to FIG. 5, wellbore 104 is within formation 102. Drill pipe 106 is positioned within wellbore 104. Following a hydraulic fracturing process, large fractures 110 exist within formation 102, extending outward from wellbore 104. Nitrogen gas generating fluids, such as a composition that includes an ammonium compound, a nitrite compound and an activator, are injected to the formation where it migrates within large fractures 110. Upon reaction, the injected fluids produce nitrogen gas and heat, thereby causing microfractures 112 to be created within the formation, thereby providing pathways for the hydrocarbon molecules trapped within the formation to migrate and be recovered.

In yet another embodiment, a composition that includes ammonium ions, nitrite ions, and acetic acid can be injected into a formation, wherein at least one of the ammonium ions and/or nitrite ions is encapsulated. It is understood that that the terms "ammonium ions" and "nitrite ions" as used herein refers to an ionic compound wherein a counter ion is included, for example, ammonium ions may be supplied as ammonium chloride. Suitable encapsulation materials can include hydrated polymers, such as guar, chitosan, and polyvinyl alcohol. In certain embodiments, the previously noted hydrated polymer encapsulation materials are preferably used as the encapsulant for the nitrite ion containing compound, such as sodium nitrite. In alternate embodiments, binders, such as carboxymethyl cellulose or xanthan can be used as an encapsulant. In certain embodiments, the carboxymethyl cellulose or xanthan may be preferred encapsulants for the ammonium ion containing compound, such as ammonium chloride. The heat of the formation, the acid, or the aqueous water for the formation can all play a role in the erosion or removal of the encapsulating material, thereby releasing the reactants.

The methods and composition described herein are responsible for the release of kinetic energy and thermal energy, which is a result of the exothermic nature of the oxidation-reduction reaction. In one embodiment, for example, aqueous solutions of ammonium chloride and sodium nitrite are mixed in the presence of an acid ($H^+$) to generate nitrogen gas, sodium chloride, water, and heat. The generation of nitrogen gas, along with the increased temperature, results in an increase in the local pore pressure and the development of microfractures in the tight formation. The balanced reaction is provided below. (The reaction requires the addition of acid or heat, not shown).

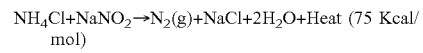

$$NH_4Cl+NaNO_2 \rightarrow N_2(g)+NaCl+2H_2O+Heat\ (75\ Kcal/mol)$$

In typical usage, the above noted reaction results in local generation of about 60 L of nitrogen per one L of reactants and about 225 Kcal of heat per one L of reactants. Without wishing to be bound by theory, it is believed that the increased pressure and temperature overcome the tensile strength of the formation, thereby leading to creation of tensile microfractures in the formation.

In one embodiment, a multi-component composition that includes at least one ammonium containing compound and at least one nitrite containing compound can be injected into a formation, wherein at least one component includes a polymer coating. In certain embodiments, the polymer coating can be hydrated to form a solid matrix with the component. Exemplary polymer coatings include guar, chitosan, polyvinyl alcohol, and like compounds. The polymer coating is operable to provide a delay in the reaction of the ammonium containing compound and the nitrite containing compound. In certain embodiments, the composition can be included in an aqueous solution that is injected into the formation. In an alternate embodiment, the composition can be included in a hydraulic fracturing fluid.

Figure 6:
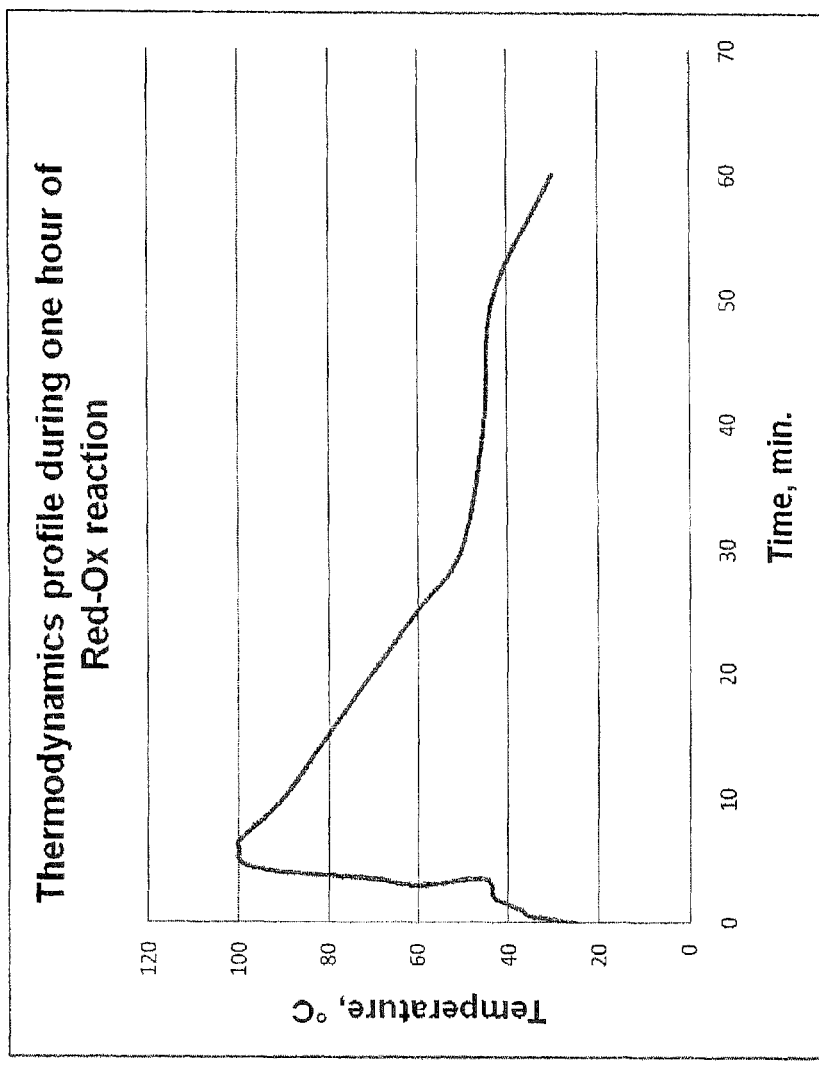
FIG. 6 is a graph showing the thermodynamic profile of a nitrogen generating reaction according to one embodiment.

FIG. 6 shows the generation of heat as a function of time for the reaction of equimolar amounts of ammonium chloride and sodium nitrite. As shown, the temperature rises rapidly to a peak after about 10 minutes of reaction, maintaining an elevated temperature for approximately 20 minutes, and slowly cooling over the next 30 minutes. This graph demonstrates that the temperature increase as a result of the exothermic reaction can be designed to ensure that certain required temperatures are achieved such that thermal fractures are created in the formation.

Figure 7:
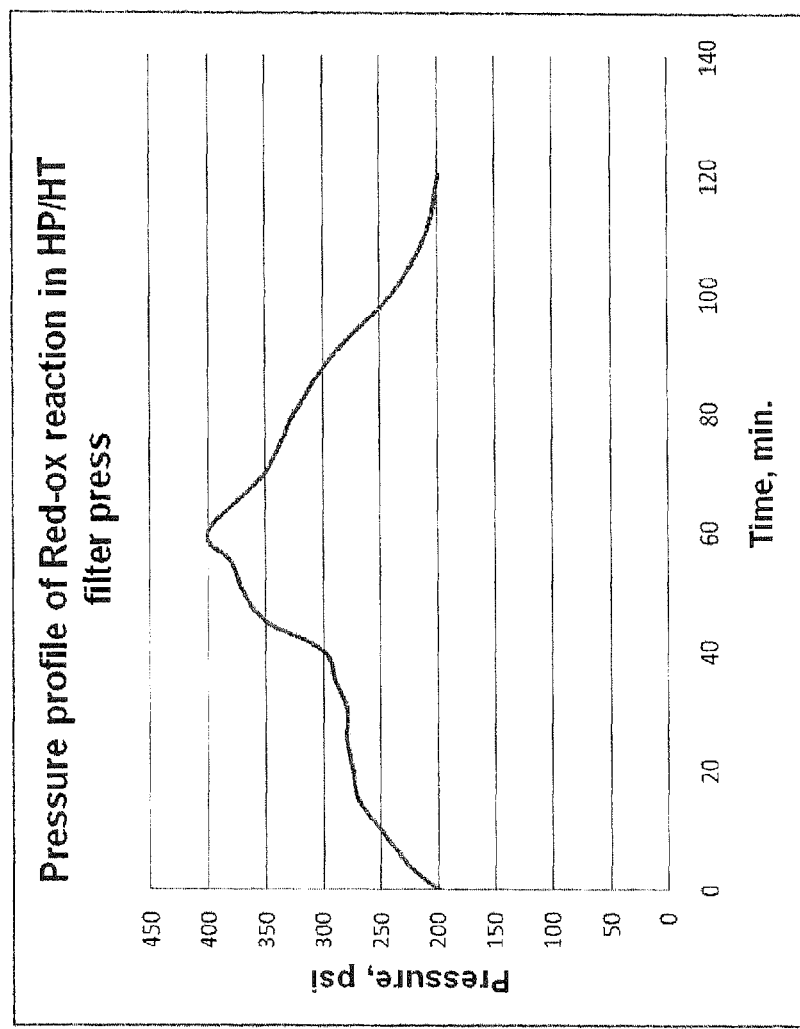
FIG. 7 is a graph showing the pressure profile of a nitrogen generating reaction according to one embodiment.

FIG. 7 provides a graph showing the amount of pressure generated by the reaction of ammonium chloride and sodium nitrite. The test was run in a high temperature, high pressure press. Prior to initiating the reaction, the press was set at 200 psi. The reaction showed that the pressure gradually increased by about 200 psi during the reaction. The graph demonstrates the increase in pressure due to the generation of nitrogen gas as a result of the chemical reaction. The amount of pressure that is generated is a function of the concentration of the reactants, allowing the reaction to be tailored to achieve certain pressures sufficient to create tensile fractures within the formation.

In an alternate embodiment, a multi-component composition that includes at least one ammonium containing compound and at least one nitrite containing compound can be injected into a formation, wherein at least one component can be encapsulated with a binder to form a solid matrix with the component. Exemplary encapsulating binders include 55-carboxymethyl cellulose, xanthan, and like compounds. Exemplary binders are preferably reactive with acid, water and/or heat such that upon contact with acid or water or upon heating, the binder erodes or dissolves, thereby allowing the reactants to react.

In another embodiment, a fracturing fluid, optionally including a proppant suspended therein, can be injected into a formation. Following injection of the fracturing fluid, a composition that includes at least one ammonium containing compound, at least one nitrite containing compound and an acid, for example acetic acid, can be injected into the formation. At least one of the ammonium ions and nitrite ions is encapsulated. In certain embodiments, a solution that includes the ammonium and nitrite ion containing composition can be injected directly into the formation after the fracturing fluids have been injected. In alternate embodiments, the ammonium and nitrite ion containing solution can be injected into the formation approximately 15 minutes after the completion of the injection of the fracturing fluid injection, alternatively approximately 30 minutes after the completion of the injection, alternatively approximately 1 hour after the completion of the injection. The acid and/or the heat of the formation can erode the encapsulating material such that the reaction between the ammonium and nitrite containing compounds is delayed, thereby allowing the reactants to migrate and seep into the fractures within the formation.

In another embodiment, an aqueous composition that includes ammonium ions, nitrite ions, and a buffer are injected into a formation in a hydraulic fracturing procedure. The buffer preferably is soluble and compatible with the ammonium and nitrite containing compounds, and the resulting reaction products. Additionally, the buffer preferably releases acidic hydrogen ions at a rate that is sufficiently slow such that the injected fluids have time to enter into the formation, and migrate into the fractures created by the hydraulic fracturing process before the pH is reduced to a value of less than about 7 and the reaction proceeds. Exemplary buffers can include acetates, including methyl acetates and ethyl acetates. The initial pH of the aqueous solution is around 7. At typical formation temperatures, methyl acetate degrades and releases acetic acid. This takes place deep inside the formation, after injection of the fluids. In certain embodiments, approximately 5% by volume of the buffer (0.1 molar solution) can be included with the reactants. The buffer acts as the activator, when it degrades and releases acetic acid within the formation. At lower temperatures, for example between about 60-70° C., acidic hydrogen atoms at a pH of between about 3 and 5 can activate the reaction. In some embodiments, the aqueous composition that includes ammonium ions, nitrite ions, and a buffer is included with a fracturing fluid and injected into a formation in a hydraulic fracturing procedure.

For each of the embodiments described herein, exemplary ammonium ions include ammonium hydroxide, ammonium chloride, ammonium bromide, ammonium nitrate, ammonium nitrite, ammonium sulfate, ammonium carbonate, ammonium hydroxide, urea, and the like.

Exemplary nitrite ions include sodium nitrite, potassium nitrite, sodium hypochlorite, and the like.

Exemplary ammonium-nitrite combinations for use herein can include, urea-sodium hypochlorite; urea-sodium nitrite; ammonium hydroxide-sodium hypochlorite; ammonium chloride-sodium nitrite, and the like. In certain embodiments, ammonium nitrite can be used as the reactant, wherein encapsulated ammonium nitrite is injected into the formation, wherein it contacts an acid, thereby leading to the reaction of the components and the generation of the desired nitrogen gas.

In certain embodiments, equal molar amounts of the ammonium containing compound and the nitrite containing compound are supplied to the formation to ensure complete reaction of both components. In alternate embodiments, up to about a 5% excess of either component can be employed, however it is generally preferred that equimolar amounts are employed. Thus, in certain embodiments, the ratio of ammonium to nitrite in the compositions disclosed herein can range from between about 1.1:1 to 1:1.1; alternatively between about 1.05:1 and 1:1.05, alternatively about 1:1.

Exemplary acids that can be used as the activator for the reaction include weak acids, such as acetic acid, citric acid and the like, strong acids, such as hydrochloric acid and the like, and diluted strong acids. In general, any compound that is capable of releasing an acidic hydrogen can be used as the activator. In certain preferred embodiments, acetic acid is used as the activator. In certain embodiments, a 0.1 molar solution of acetic acid having a concentration of about 0.5% by volume (of the total volume) can be utilized. In certain embodiments, dilute weak acids, such as dilute hydrochloric acid, can be used to activate the reaction, with or without the addition of a buffer. One main advantage to the use of dilute strong acids is increased control over the reaction.

In certain embodiments, the procedures described herein can utilize the elevated temperatures within the formation as the activator or co-activator (along with the acid or other hydrogen releasing compound) for the reaction. For example, in certain embodiments, the temperature within the formation may be about 200° C. In certain embodiments, a temperature of at least about 60° C., alternatively at a temperature of at least about 70° C. In certain embodiments, the temperature is between about 60° C. and 70° C., alternatively the temperature is between about 65° C. and 80° C. is desired. As noted above, in certain embodiments wherein the temperature of the formation is used to activate or initiate the reaction, a buffer can be employed such that acidic hydrogen ions are released slowly.

In certain embodiments, the fluids used in this application can include certain chemical additives that can help to form a viscous fracturing fluid. The chemical additives can include at least one solvent and at least one polymer that is soluble in the solvent. The total composition of the fracturing fluid can also include a reducing agent, an oxidizing agent, and an activator. The solvent can also include water and/or a surfactant, depending on the type of formation being treated. The oxidizing agent can be an ammonium containing compound, such as ammonium chloride, and the reducing agent can be a nitrite containing compounds, such as sodium nitrite. The activator can be an acid, such as hydrochloric acid or acetic acid. The polymer can be mixed with the solvent or water to form a viscous fluid. Exemplary polymers that can be used include guar and carboxymethyl cellulose. The polymer can be used to coat at least one of the reactants, for example ammonium chloride, to prevent premature reaction and to also provide addition viscosity to the fluid. The oxidizing agent and the reducing agent, however, can still be injected into the formation separately at a later stage after the viscous polymer containing solution is injected for purposes of fracturing. Following injection of the oxidizing and reducing agents, the initiator can be injected to trigger the reaction and thereby create a synthetic sweet spot. The created synthetic sweet spot will have higher pressure than surrounding formation rock, but the pressure that is generated will be at least partially consumed to generate fractures in the formation. If the pressure was not high enough to break the formation, however, then the local increase in pressure is analogous to a sweet spot itself, because the increase in pressure will assist in producing the reservoir hydrocarbon. The main intention of the methods and compositions described herein, however, is to generate sufficient pressure to cause microfractures, thereby increasing the porosity and permeability of formation.

Generally, during successful hydraulic fracturing procedures, the fracturing liquid must be removed from the well upon completion of the stimulation treatment. The process can be both costly and time consuming. Advantageously, the compositions and methods described herein are designed to cause no damage to the formation, which is a challenge considering the current fracturing technologies. To overcome this problem, the compositions and methods described herein advantageously utilize novel combinations of nitrogen generating chemicals as the hydraulic fracturing liquid-base. Thus, in certain embodiments, the liquids used for fracturing of the formation, which can include the nitrogen generating chemicals previously described, can be injected into the formation though the wellbore or other injection means at a sufficiently high injection rate so as to create pressures within the formation that can effectively fracture the rock or open previously existing fractures. As the fracturing liquid seeps into the formation, these nitrogen generating chemicals can be triggered to react, thereby generating large amounts of nitrogen gas and heat within the formation and near the newly created fracture surfaces. In certain embodiments, the triggering mechanism can be the heat of the formation temperature. In alternate embodiments, the triggering mechanism can be an injected fluid, such as an acid, that can be injected at the end of the fracturing process. The generated nitrogen gas and heat can create additional microfractures and thermal fractures at or near the fracture formed as a result of the hydraulic fracturing. The reaction generates at least about 200 Kcal and 50 L of nitrogen gas per liter of the nitrogen generating chemicals that is supplied to the reaction, alternatively about 225 Kcal and 60 L of nitrogen per liter of the nitrogen generating chemicals supplied to the reaction.

In certain embodiments, a polymer can be mixed with ammonium solution, nitrite solution, or a combination thereof, and can serve as the base fluid being injected in the formation. Generally, the injection of the base fluid is followed by the injection of an acid, such as hydrochloric or acetic acid. Thus, in certain embodiments, the hydraulic fracturing fluid can include a solvent base, such as water, a polymer viscosifying agent, and an ammonium containing compound. In such an embodiment, following the injection of the fracturing fluid, a nitrite containing compound and activator would be injected into the formation, either in a single injection, or in series (i.e., the nitrite containing compound would be injected, followed by the injection of the initiator).

In an alternate embodiment, a hydraulic fracturing fluid can include a solvent base, such as water, a polymer viscosifying agent, and a nitrite containing compound. In such an embodiment, following the injection of the fracturing fluid, an ammonium containing compound and activator would then be injected into the formation, either in a single injection, or in series (i.e., the ammonium containing compound would be injected into the formation first, followed by the injection of the initiator).

In certain embodiments, the acetic acid concentration can be between about 0.5 and 5 vol. % of the total volume of fluids being injected into the formation. The acetic acid concentration can range from about 0.5 to 1 molar, such that the solution pH is between about 3 and 5. The ratio of ammonium chloride to sodium nitrite can be between about 1:2 and 2:1, alternatively between about 1:1.5 and 1.5:1, alternatively between about 1:1.25 and 1.25:1, alternatively about 1:1. In certain embodiments the ratio of ammonium chloride to sodium nitrite can be between about 1:1 and 2:1, alternatively between about 1:1 and 1.5:1, alternatively between about 1.25:1. The mixture of nitrogen generating compounds can make up to about 50% by volume of the total fluid volume, alternatively up to about 40%, alternatively up to about 30%, alternatively up to about 20%. The reaction can occur at any concentration of reactants, however in certain embodiments, the molarity of the ammonium chloride and sodium nitrite can range between about 2 and 10 molar, alternatively between about 2 and 5 molar, or alternatively between about 5 and 10 molar. The mixture of nitrogen generating compounds can be up to about 40% by volume of the total volume of fluids being injected, alternatively up to about 50% of the total volume, alternatively up to about 60%. In certain embodiments, the remainder of the volume can be water. In certain embodiments, the composition includes at least about 40% by volume water, alternatively at least about 50% by volume water, alternatively at least about 60% by volume, alternatively at least about 70% by volume water. In certain embodiments, additional additives can be added to the composition, for example, surfactants, iron control (citric acid), friction reducers, and the like. The fracturing fluids can be water-based, oil-based, or foam based (i.e., liquid and gas) fracturing fluids. The encapsulated reactants can be added to any of the above fracturing fluids.

Advantageously, in contrast to some currently employed stimulation methods, the methods and compositions described herein do not produce any damaging by-products as a result of the in-situ reaction. For example, the acids utilized as activators are typically consumed by the reaction and are only present in relatively small quantities such that there is little or no residual acid remaining that may cause environmental concerns. As a result, following the stimulation procedure, no clean-up procedure is required. Thus, through the creation of the synthetic sweet spots, maximum enhancement of gas production with a minimal creation of damaging waste products is provided.

In certain embodiments, the methods and compositions described herein advantageously and unexpectedly reduce or eliminate formation damage that can be caused by a fracturing gel, water blockage, and/or condensate banking. These conditions result in reduced permeability of fluids within the formation, and subsequently lead to poor production of a well. The generation of the synthetic sweet spot according to the methods described herein avoids these problems.

In certain embodiments, the methods and compositions described herein advantageously and unexpectedly create synthetic sweet spots in tight-gas reservoirs that lack the presence of such important flow-supporting stratas. As noted previously, a sweet spot is an area of maximum production within a formation. These formations lack the pathways that allow for the flow of hydrocarbon fluids and gases to a point of production.

The methods and compositions provided herein solve several problems that are frequently encountered during the construction of commercial wells in tight-gas reservoirs.

First, problems associated with damage to the formation caused by current hydraulic fracturing methods can be reduced or eliminated. For example, the methods and compositions described herein, advantageously help to reduce or eliminate fracturing-fluid filtrate that can be locked near a recently created fracture surface by creating many tensile fractures near the fracture surface such that any filtrate readily flows through these fractures toward the well.

Second, the methods and compositions provided herein, advantageously enhance production over traditional hydraulic fracturing methods through the creation of microfractures, which provide additional conductivity to the near fracture surface such that it provides new channels for gas to flow toward the created fracture. The additional reservoir volume contacting the well contributes significantly to the overall flow efficiency of the drainage area being affected by the induced fracture.

Finally, current hydraulic fracturing techniques that require many fracturing stages to create sufficient reservoir volume contact within the well to be commercial are eliminated as a result of the production of microfractures due to the gas and heat that are produced. By reducing the number of required fracturing stages for same production, the present stimulation treatment described herein is both more cost effective and accomplished more quickly, thereby providing viable economical options for the stimulation of low producing wells.

Figure 8:
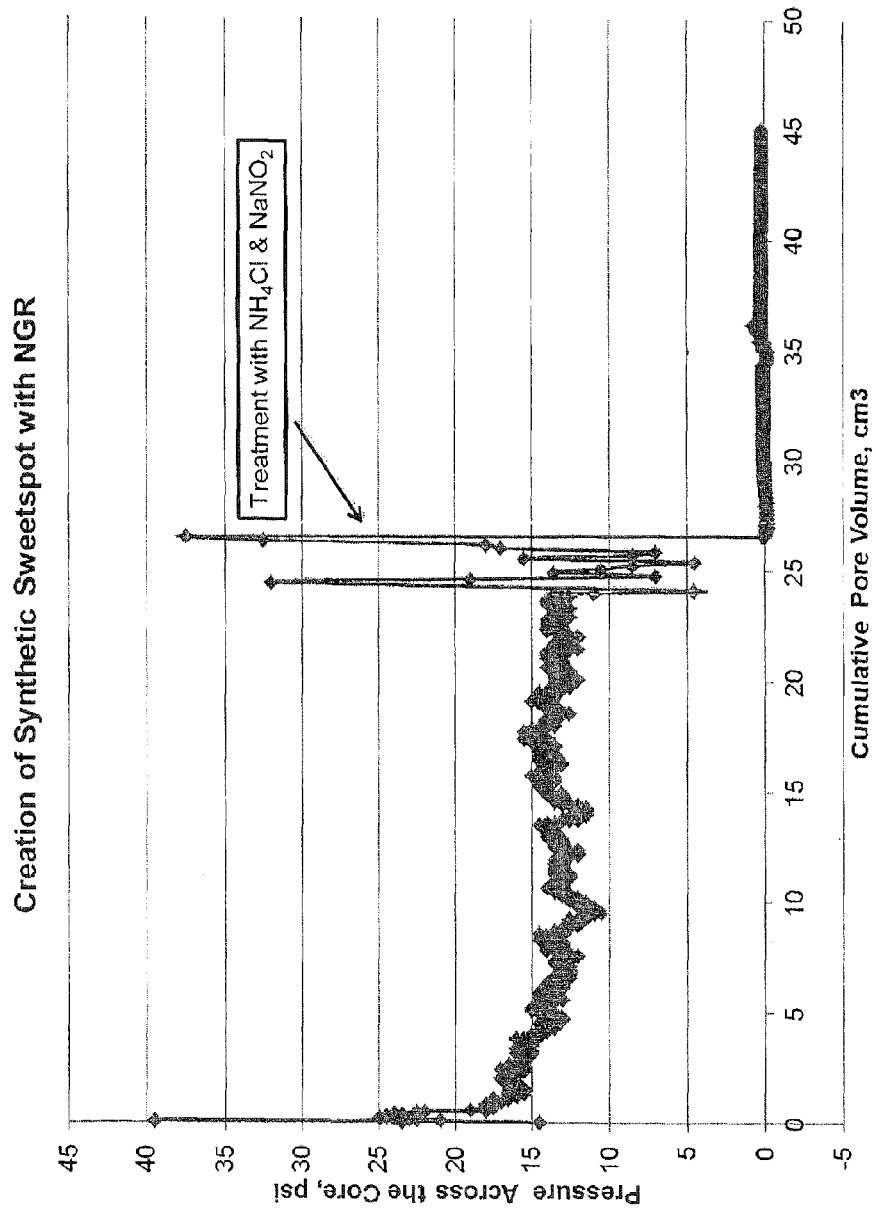
FIG. 8 is a graph showing cumulative pore volume as a function of core pressure of one embodiment.

FIG. 8 provides a graph showing the increase in cumulative pore volume of the formation ($cm^3$) as a function of pressure. A core flood test of the nitrogen generating compounds in a carbonate core was performed. Pressure across the core prior to the generation of the synthetic sweet spot was approximately 15 psi and the permeability ($K_{brine}$) was about 3.7 md. After nitrogen generation (i.e., the synthetic generation of a sweet spot in the core sample) pressure across the core was approximately 0 psi, and permeability ($K_{brine}$) increased to about 982.2 md. As brine permeability increased, the pressure drop across the tested core sample was reduced from about 15 psi to 0 psi, indicating an increase in the core permeability and porosity, thus signaling the creation of a sweet spot.

The testing procedure for determining the creation of a sweet spot proceeds as follows. The Coreflood testing device was designed such that the tested core sample has two inlet lines and one outlet lines. Each inlet line has its own pump and feed container. The core was evacuated of air by administering a saturated brine solution (7 wt % NaCl). The core was then loaded into the core holder. Approximately 3000 psi confining stress pressure was applied and 500 psi backpressure was maintained. The temperature was raised to about 200° F. A 7 wt % sodium chloride brine solution was injected in the pre-designated production direction until a stable differential pressure was obtained. The absolute permeability to brine was then calculated. A mixture of ammonium chloride (2 molar) and acetic acid (1 molar) was injected into the core sample from one inlet, and at the same time sodium nitrate (2 molar) was injected from the other inlet, such that both solutions meet at the inlet of the core sample. A 7 wt % sodium chloride brine solution was then injected at a constant rate and measure absolute permeability to brine.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed is:

1. A method for stimulating production of gas in a tight-gas formation, the method comprising the steps of:
   injecting into the tight-gas formation an aqueous solution comprising an ammonium containing compound and a nitrite containing compound, wherein at least one of the ammonium containing compound and the nitrite containing compound are encapsulated with a coating operable to delay an exothermic reaction therebetween, wherein the aqueous solution is injected at a sufficient rate and pressure to cause fractures in the tight-gas formation, wherein the fractures extend into the tight-gas formation, wherein the fractures have a fracture surface;

injecting an acidic activator into the tight-gas formation, the acidic activator comprising a weak acid being capable of initiating the exothermic reaction between the ammonium containing compound and the nitrite containing compound such that the reaction generates heat and nitrogen gas, wherein the exothermic reaction consumes all of the acidic activator; and allowing the generation of nitrogen gas and heat within the tight-gas formation, after all of the acidic activator is consumed, to effect stimulation of the fracture surface, wherein the stimulation of the fracture surface produces microfractures at the fracture surface without damaging the tight-gas formation, wherein the generation of nitrogen gas and heat increases cumulative pore volume and core permeability of the tight-gas formation, wherein the hydrostatic pressure within the reservoir is reduced to less than the reservoir fluid pressure, such that the rate of production of hydrocarbons from the tight-gas formation is increased, and wherein the coating is operable to delay the reaction according to:

heat within the tight-gas formation being between about 60° C. and about 200° C.; concentration of the acidic activator being between about 2% and about 10% by volume; and concentration of the aqueous solution, wherein the aqueous solution comprises the ammonium containing compound and the nitrite containing compound in a molar ratio range of about 1.1:1 to about 1:1.1 ammonium containing compound to nitrite containing compound, such that the at least one encapsulated compound is released to react to create a pressure of at least about 400 psi to cause the fractures in the tight-gas formation.

2. The method of claim 1, further comprising the step of injecting an additional fracturing fluid comprising water and a fracturing polymer gel into the tight-gas formation.

3. The method of claim 1, wherein the molar ratio of the ammonium containing compound to the nitrite containing compound is between about 1.05:1 and 1:1.05.

4. The method of claim 1, wherein the acidic activator is a weak acid and weak acid salt, said weak acid and weak acid salt being present in a ratio providing an acidic solution pH at which said ammonium and nitrite containing compounds react.

5. The method of claim 4, wherein said mixture of weak acid and weak acid salt is injected into the tight-gas formation in a solution having a concentration between about 2-10% by volume.

6. The method of claim 1, wherein the coating encapsulating at least one of the ammonium containing compound and the nitrite containing compound is selected from guar, chitosan, polyvinyl alcohol, and like compounds.

7. The method of claim 1, wherein the coating encapsulating at least one of the ammonium containing compound and the nitrite containing compound is selected from 55-carboxymethyl cellulose, xanthan, and like compounds.

8. The method of claim 1, wherein the ammonium containing compound comprises ammonium chloride.

9. The method of claim 1, wherein the nitrite containing compound comprises sodium nitrite.

10. The method of claim 1, wherein no clean-up procedure is required.

11. The method of claim 1, wherein the generation of nitrogen gas creates an area of localized pressure.

12. The method of claim 1, wherein the generation of nitrogen gas and heat is operable to cause tensile and thermal fractures.

13. The method of claim 1, wherein the delay in reaction allows the aqueous solution to migrate into the fractures created within the tight-gas formation during the step of injection the aqueous solution.

14. The method of claim 1, wherein a synthetic sweet spot is created, thereby stimulating production of gas.

* * * * *